P. W. PRATT.
MACHINE FOR IMPREGNATING FABRICS.
APPLICATION FILED JAN. 9, 1911.

1,011,242.  Patented Dec. 12, 1911.
7 SHEETS—SHEET 1.

Witnesses:
Harry L. Allen

Inventor
P. W. Pratt

P. W. PRATT.
MACHINE FOR IMPREGNATING FABRICS.
APPLICATION FILED JAN. 9, 1911.

1,011,242.

Patented Dec. 12, 1911.
7 SHEETS—SHEET 2.

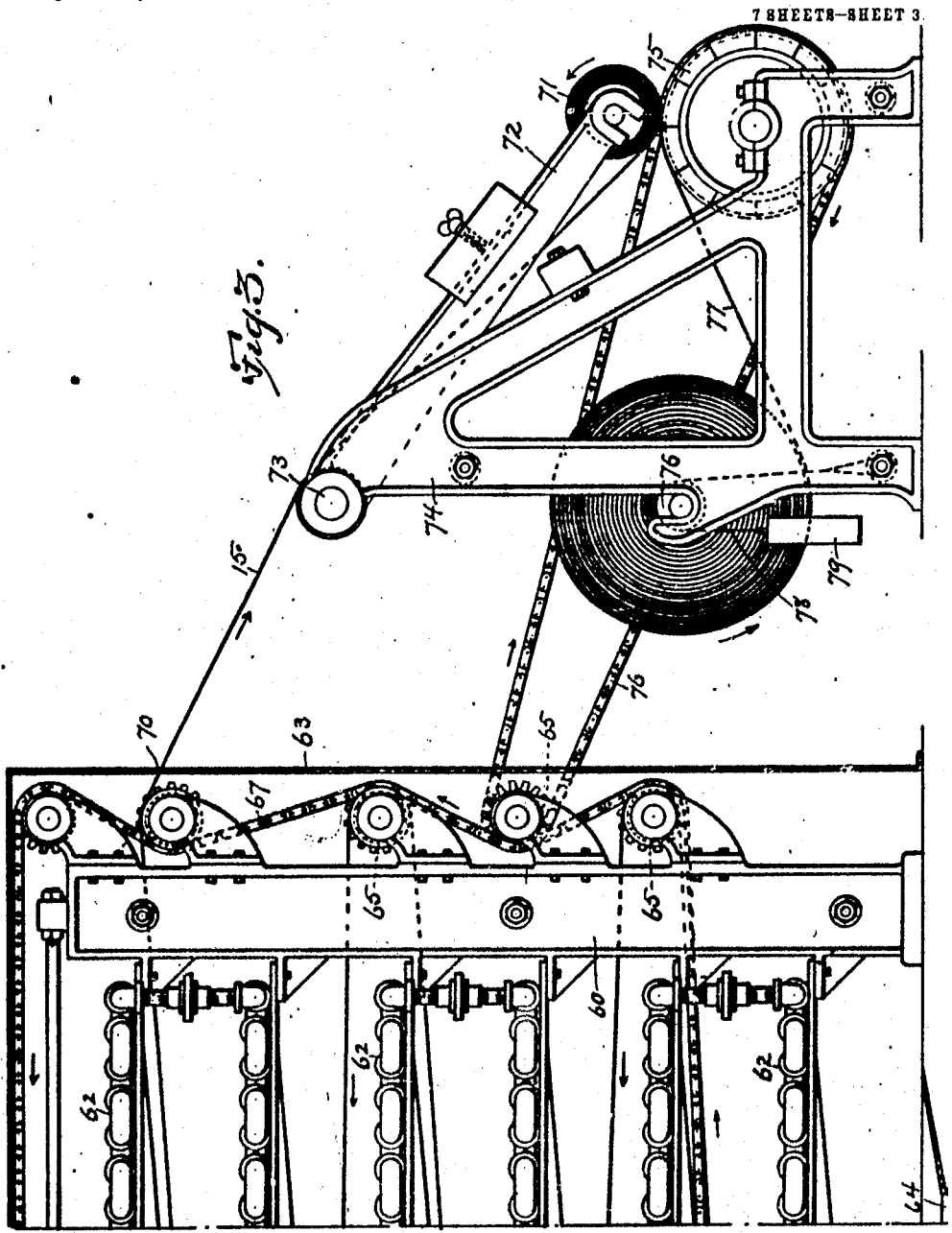

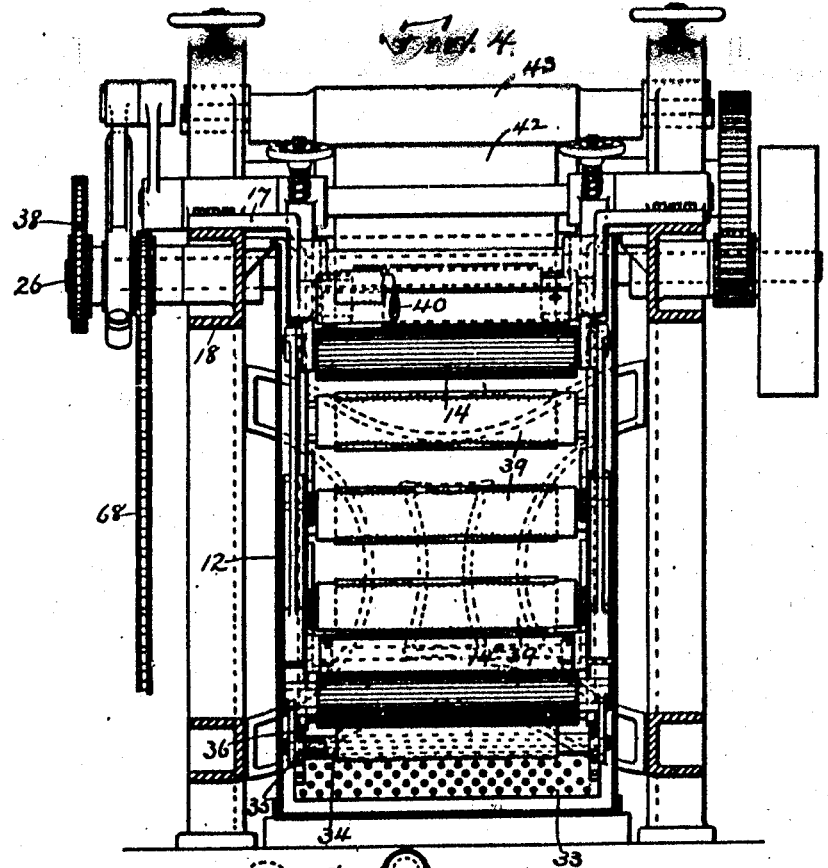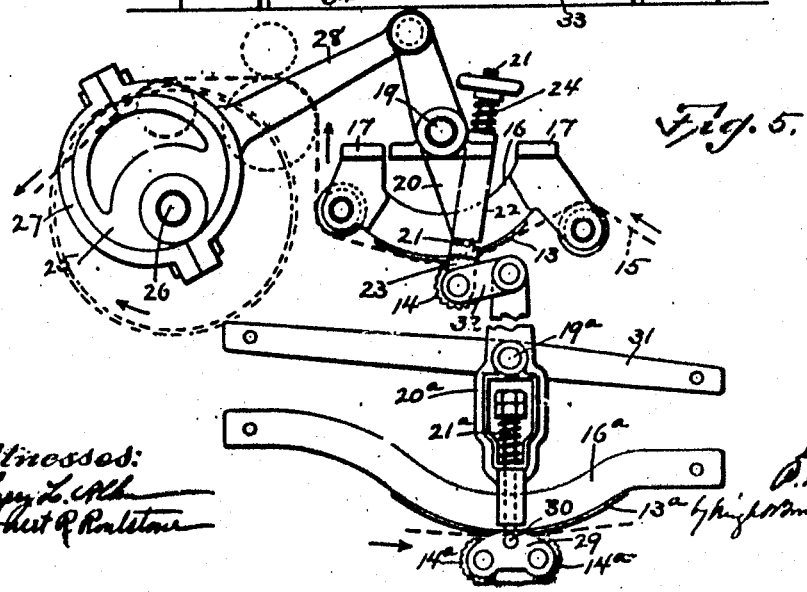

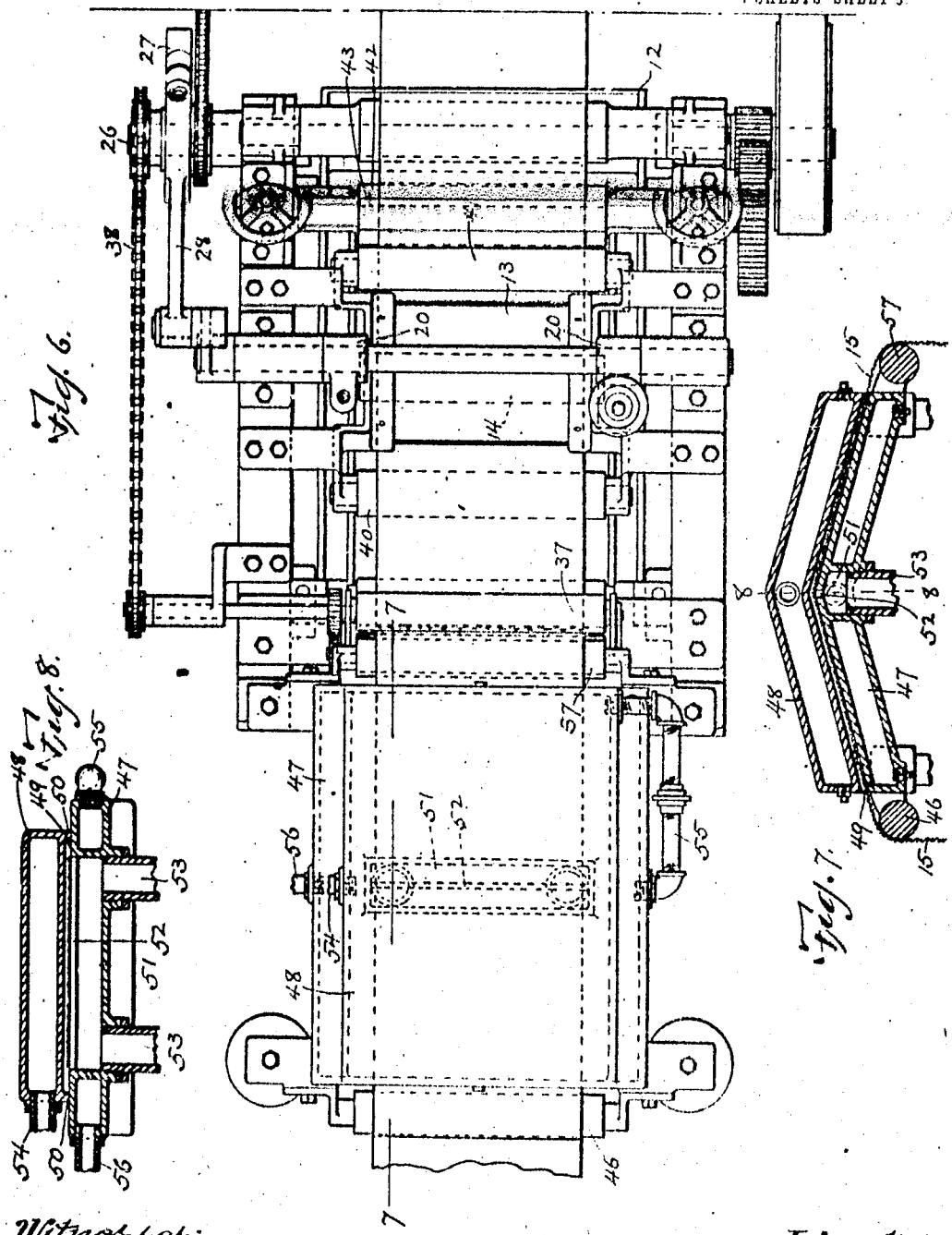

P. W. PRATT.
MACHINE FOR IMPREGNATING FABRICS.
APPLICATION FILED JAN. 9, 1911.
1,011,242.
Patented Dec. 12, 1911.
7 SHEETS—SHEET 6.
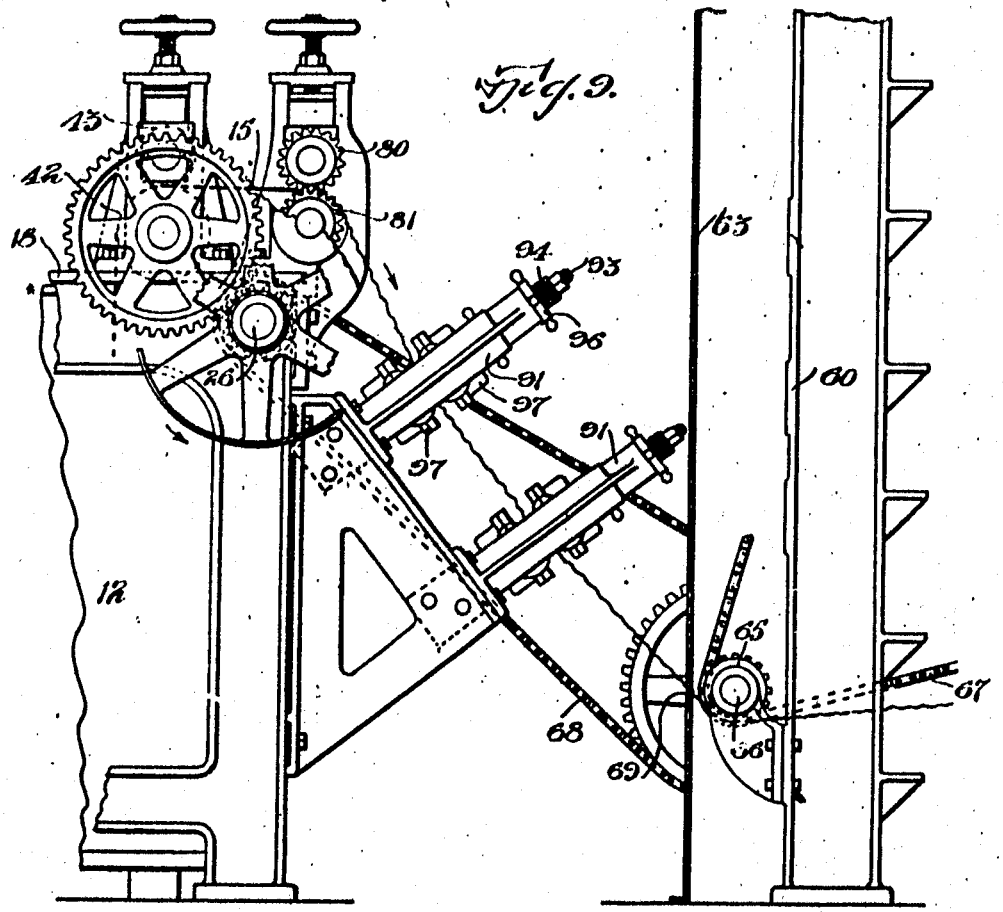
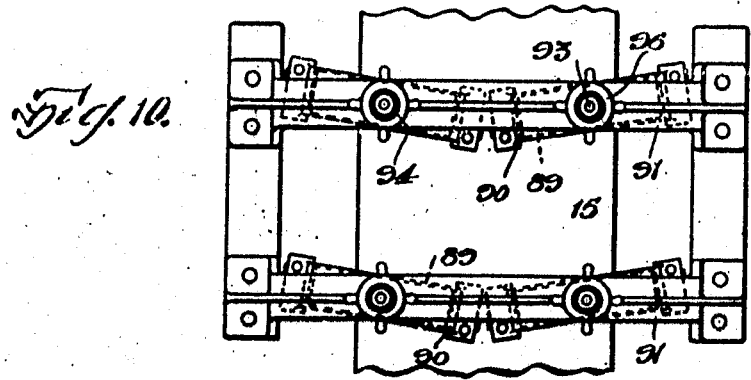

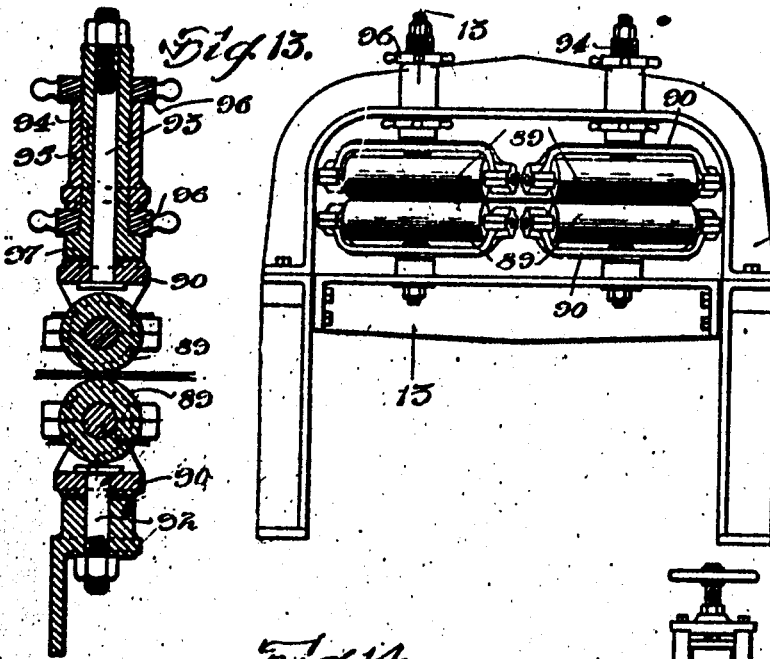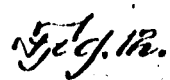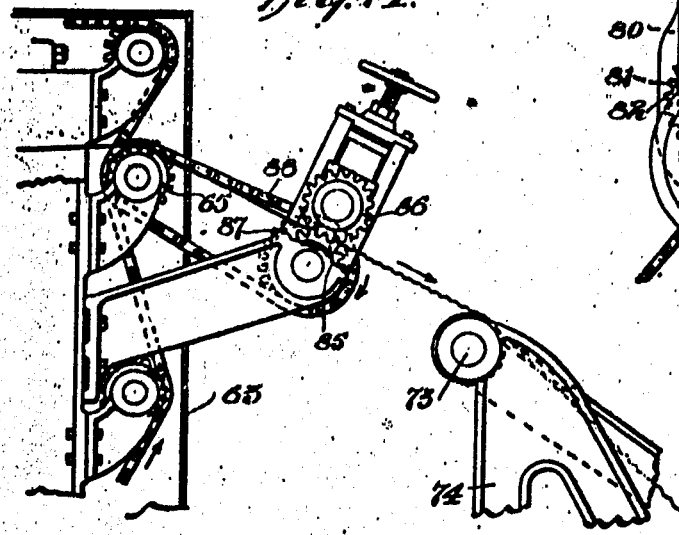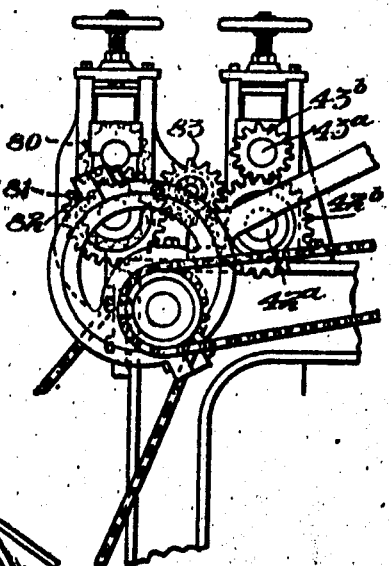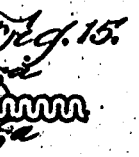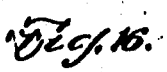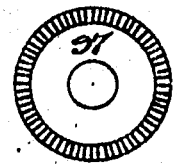

UNITED STATES PATENT OFFICE.

PHILIP W. PRATT, OF BOSTON, MASSACHUSETTS.

MACHINE FOR IMPREGNATING FABRICS.

1,011,242.  Specification of Letters Patent.  Patented Dec. 12, 1911.

Application filed January 9, 1911. Serial No. 601,527.

*To all whom it may concern:*

Be it known that I, PHILIP W. PRATT, a citizen of the United States, residing at Boston, in the county of Suffolk and State of Massachusetts, have invented certain new and useful Improvements in Machines for Impregnating Fabrics, of which the following is a specification.

This invention has for its object to provide a machine for impregnating textile fabric, such as cotton duck or canvas, with a composition intended to adapt the fabric for certain uses such as the manufacture of automobile tires, driving belts, etc.

My invention has particular reference to the impregnation of fabric with a solution of unvulcanized rubber commonly known as "rubber cement" for the purpose of frictioning the fabric and thus adapting it for use in the manufacture of various articles of which frictioned fabric forms a part. My aim is to force the frictioning composition so thoroughly into the fabric that all parts of it will be permeated by the composition, so that all the fibers of the fabric will be intimately united, and the surfaces of the fabric will be intimately united to the like surfaces with which they are in contact, when the fabric has been subjected to heat to vulcanize the rubber solution.

My invention is embodied in a machine which includes a reservoir adapted to contain a composition such as rubber cement, means for guiding a web or strip of fabric through the reservoir, a bed within the reservoir in contact with the moving fabric, and a pressure member which is arranged to press the fabric against the bed and is adapted to be reciprocated in contact with the fabric interposed between it and the bed, the bed and the pressure member acting conjointly to rub and press the composition thoroughly into the meshes and fibers of the fabric. The invention is also embodied in various other features incidental to the general purposes above stated, said features including means for drying and heating the fabric before it enters the reservoir, and means for drying the impregnated fabric after it has passed through the reservoir.

Figure 1:
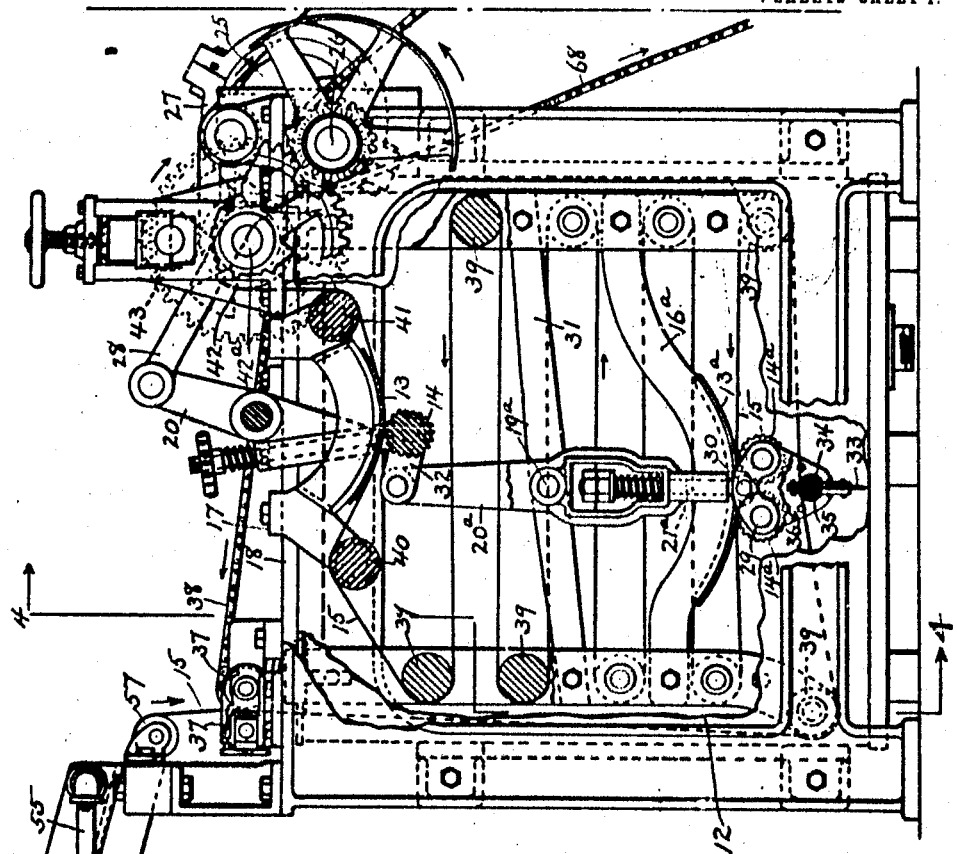
Figure 1:
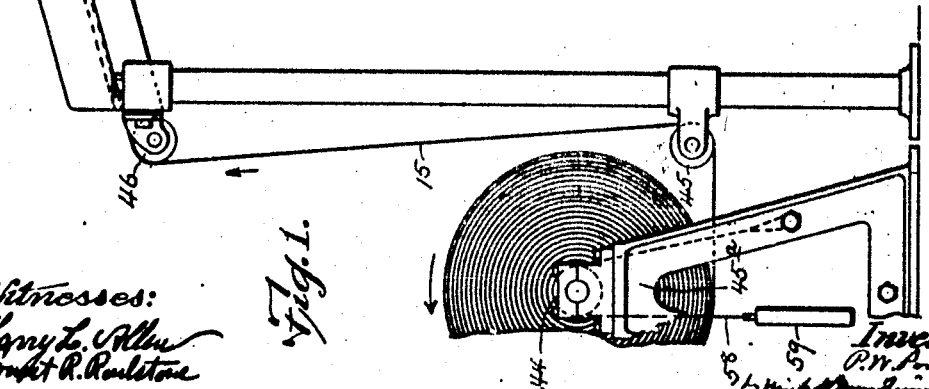
Figure 2:
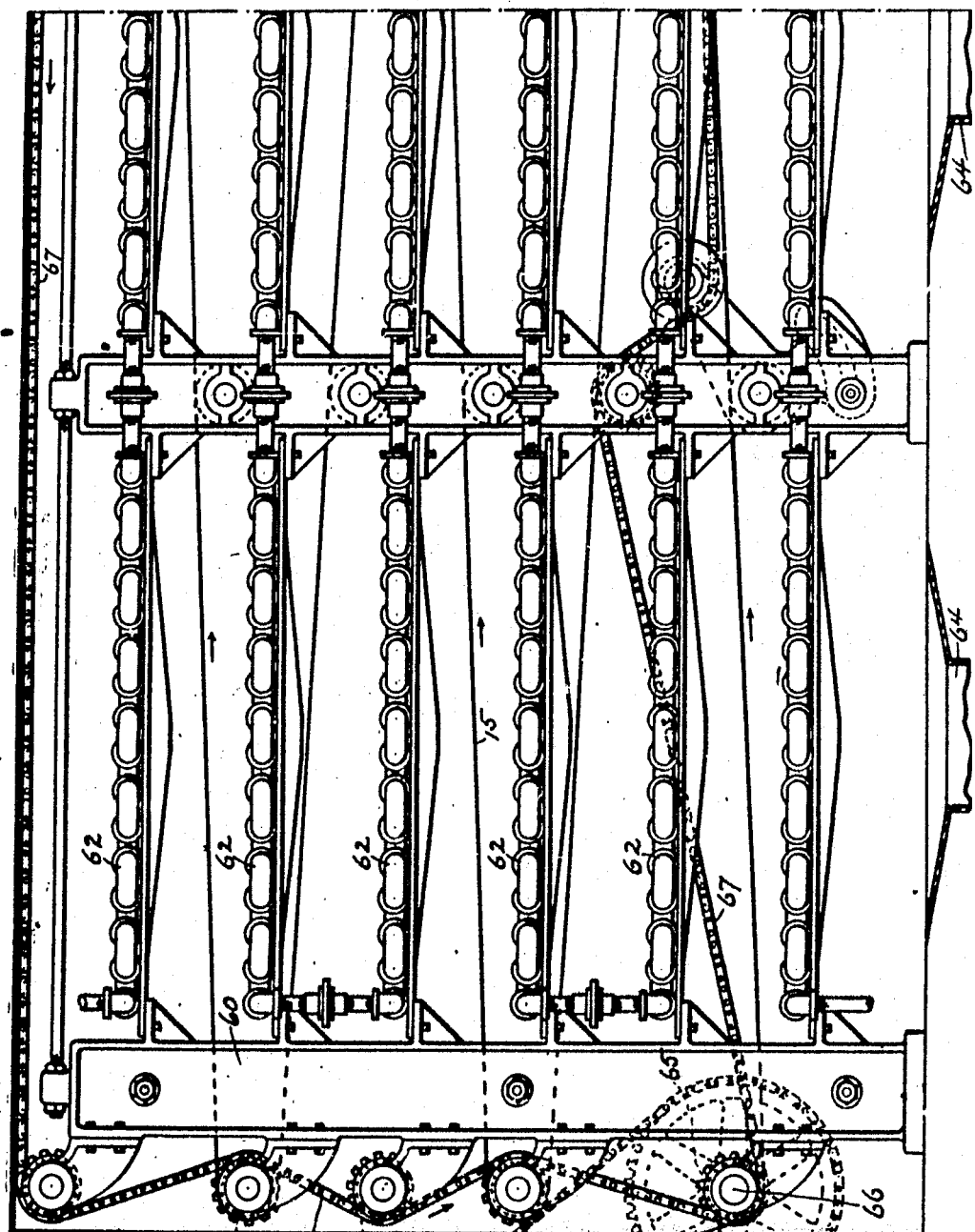

Of the accompanying drawings which form a part of this specification—Figure 1 represents a side elevation of a portion of an impregnating machine embodying my invention, parts being broken away and other parts being shown in section; Figs. 2 and 3 represent side elevations of other parts of the machine, the entire machine being represented by Figs. 1, 2, and 3; Fig. 4 represents a section on line 4—4 of Fig. 1; Fig. 5 represents a side elevation of parts of the machine showing the preferred means for forcing the composition into the fabric; Fig. 6 represents a plan view of the portion of the machine represented by Fig. 1; Fig. 7 represents a section on line 7—7 of Fig. 6; Fig. 8 represents a section on line 8—8 of Fig. 7; Fig. 9 represents a side elevation of a part of the machine showing parts not shown in the preceding figures; Fig. 10 represents a plan view of a part of the construction shown by Fig. 9; Fig. 11 represents an elevation of the opposite side of a part of the construction shown by Fig. 9; Fig. 12 represents a side elevation of the oblique smoothing rolls hereinafter referred to, and the means for supporting the same; Fig. 13 represents a section on line 13—13 of Fig. 12; Fig. 14 represents a side elevation of another part of the machine showing additional corrugating rolls; Fig. 15 represents an edge view showing a piece of the fabric plaited; and Fig. 16 represents a side view of the corrugated washer hereinafter referred to.

Similar reference characters indicate the same or similar parts in all the figures.

In the drawings, 12 represents a reservoir adapted to contain a suitable quantity of an impregnating composition such as rubber cement.

13 represents a fixed bed located within the reservoir and submerged in the composition.

14 represents a pressure member which is preferably a longitudinal corrugated idle roll adapted to be reciprocated sidewise or in a direction at right angles to its axis on rotation in a path conforming to the contour of the bed, the pressure member being pressed yieldingly toward the bed so that it exerts pressure on the portion of a strip or web 15 of fabric which is interposed between the bed and the pressure member, the strip 15 being moved progressively and therefore impregnated by the conjoint action of the bed and pressure member, the latter forcing the composition into the meshes of the fabric.

The bed 13 may be of any desired form and is preferably of segmental form, as shown by Figs. 1 and 5, and is rigidly supported in any suitable way within the reservoir, preferably by means of a frame 16 to which the bed is attached, said frame having ears 17 bolted to the side members 18 of the supporting frame of the machine. The pressure member 14, which is in all cases reciprocated in a path parallel with the bed, is preferably carried by a pair of levers which are pivoted at 19, each lever including a pivoted body portion 20, and a portion 21, which is movable in a guide or socket 22 on the body portion and is provided with bearings 23 (Fig. 5) in which the shaft of the pressure member 14 is journaled. The portions 21 of the levers are controlled by springs 24 which act to press the member 14 yieldingly toward the bed 13. The levers 20 are oscillated by means of eccentrics 25, affixed to a driving shaft 26, straps 27 surrounding said eccentrics, and rods 28 connecting said straps with the upper ends of the levers 20.

I prefer to provide two beds and pressure members, one located in the upper and the other in the lower portion of the reservoir. The upper bed 13, and the corresponding pressure member 14 are described above. The lower bed 13ª is also segmental and is supported by frame pieces 16ª which may be bolted to the sides of the reservoir. The pressure member accompanying the lower bed is, as here shown, composed of a pair of longitudinal corrugated idle rolls 14ª, 14ª, journaled in bearings 29. These bearings are pivoted at 30 to the lower ends of the spring-pressed portions 21ª of the levers which carry the lower pressure member, each of said levers including a body portion 20ª pivoted at 19ª to a frame bar 31 bolted to the reservoir. The levers carrying the lower pressure members are connected with the levers carrying the upper pressure members by links 32, which transmit motion from the upper to the lower levers, the upper and lower pressure members being therefore moved simultaneously in opposite directions. The pivotal connection of the bearings 29 to the levers, enables said bearings to rock and equalize pressure on the rolls 14ª, 14ª, against the fabric interposed between them and the bed 13ª.

It will now be seen that provision is made for forcing the composition simultaneously into two portions of the fabric, one of said portions being at the lower part and the other at the upper part of the reservoir. The composition in the lower part of the reservoir having greater density than that in the upper part, probably penetrates the fabric more deeply than the composition at the upper portion of the tank.

33 represents a stirring blade or agitator which is movable with the lower pressure member and is adapted to prevent sedimentation in the reservoir, the blade being preferably perforated, as shown by Fig. 4. As here shown, the blade 33 is attached to a sleeve 34 mounted on a rod 35 which is affixed to the ears 36 depending from the bearings 29.

The fabric 15 is guided into the tank between feed rolls 37 (Figs. 1 and 6) one of which is driven by a sprocket chain 38 from a sprocket wheel on the driving shaft 26. Within the reservoir are a series of guide rolls 39, arranged to guide the fabric in a series of substantially horizontal stretches, the fabric passing from the feed rolls 37 to the lowest guide roll 39 and from thence upwardly over the intermediate guide rolls.

As shown by Fig. 1, the fabric passes from the upper guide roll 39 over a guide roll 40 to the bed 13, and under a guide roll 41 between feed rolls 42 and 43 which are located above the reservoir, the feed roll 42 being geared to and driven by the driving shaft 26. The fabric is thus moved progressively through the tank, one of the lower stretches of the fabric passing between the lower bed 13ª and the corresponding pressure member, while the upper stretch of fabric between the guide rolls 40 and 41, passes between the upper bed 13 and the corresponding pressure member 14.

The fabric before treatment is wound on a delivering roll 44 which is journaled in bearings in a frame 45ª at one end of the machine, the fabric passing from the roll 44 in contact with the guide rolls 45 and 46, to a preliminary drier which heats and dries the fabric and delivers it in a heated condition to the reservoir. The said drier, which is shown in section by Figs. 7 and 8, includes two chambers 47, 48, each adapted to be heated internally by steam or other heating medium. Said chambers are preferably of angular form in cross section, as shown by Fig. 7, and are separated from each other by a narrow passage 49 through which the fabric passes, the opposed sides of the chambers being in close proximity to the fabric interposed between the chambers. The chamber 48 is preferably provided with flanges 50 (Fig. 8) which bear on the chamber 47 and form the edges of the passage 49.

51 represents a suction box, which is included in the structure of the chamber 47, the latter being sub-divided as shown by Figs. 7 and 8, to form the suction box be tween two heated portions of the chamber 47. In the top of the suction box is a narrow slot 52 extending crosswise of the passage 49.

53, 53 represent suction pipes which are connected with a suitable air-exhausting apparatus, not shown, acting to exhaust air from the suction box and from the passage 49 through the slot 52. Provision is thus made for removing any steam or vapor which may be generated from moisture in the fabric by the heated walls of the passage 49. The heat and suction insure the thorough drying of the fabric and its entrance into the tank in a dry and hot condition. The flanges 50 close the passage 49 at its opposite edges so that air can enter the passage 49 only at its opposite ends and has to pass over the heated surfaces of the chambers before passing through the slot 52.

The means here shown for circulating the heating medium through the chambers 47, 48 comprise a supply pipe 54, entering one edge of the chamber 48, a by-pass 55 connecting one end of the chamber 48 with the central portion of the chamber 47, and an outlet pipe 56 connected with one edge of the chamber 47.

The chambers 47 and 48 are so arranged that the delivering end of the passage 49 is above and in close proximity to the feed rolls 37, the fabric passing from the passage 49 over a guide roll 57 to the feed rolls 37.

The fabric is kept under suitable tension between the supply rolls 44 and the feed rolls 37 by a friction brake 58 (Fig. 1) applied to the periphery of the roll 44 and controlled by a weight 59.

The impregnated fabric passes from the feed rolls 42 and 43 through a secondary drier, shown in elevation by Figs. 2 and 3. Said drier comprises a frame 60 having supports for a plurality of manifold steam pipes 62, each series of manifolds being horizontally arranged to form open heating shelves, and the manifolds being suitably connected so that steam passes continuously through the entire series. A casing 63 surrounds the frame and the heating manifolds, said casing being preferably provided with inlets 64 in the bottom, for the admission of air. Journaled in bearings at the end portions of the frame 60 are guide rolls 65, arranged to conduct the fabric in a series of substantially parallel stretches between the manifolds 62. The guide rolls 65 are positively driven from a shaft 66, supporting one of said rolls, by sprocket chains 67 engaged with a sprocket wheel on the shaft 66 and corresponding sprocket wheels on the rolls 65, the shaft 66 being driven from the main driving shaft 26 through a sprocket chain 68 engaged with sprocket wheels affixed to the said shafts. The fabric passes from the feed rolls 42, 43, to the lower guide roll 65 through an opening 69 in the casing 63, the course of the fabric through the secondary drier being clearly indicated by Figs. 2 and 3. The impregnating composition is thoroughly dried during the passage of the fabric through the secondary drier, the fabric emerging from the casing 63 through an opening 70, (Fig. 3).

The dried fabric is accumulated on a winding roll 71 (Fig. 3), the trunnions of which are journaled in bearings or swinging arms 72, pivoted at 73, to a frame 74, located adjacent to the delivering end of the secondary drier.

75 represents a drum which is driven by a sprocket chain 3 engaged with a sprocket wheel on one of the driven guide rolls 65. The accumulation of fabric on the winding roll 71 is in frictional contact with the drum 75 and is rotated therefore in the direction required to accumulate it on the winding roll 71. As the accumulation increases, the winding roll rises, the arm 72 swinging upwardly.

76 represents a roll on which is wound an accumulation of paraffin paper 77, or other material adapted to be interposed between the convolutions of the impregnated fabric on the winding roll 71 to prevent said convolutions adhering to each other. The paper 77 passes with the impregnated fabric 15 to the winding roll 71 and is wound therewith, the convolutions of the fabric and paper alternating. Tension is maintained on the paper 77 by a friction brake 78 bearing on the periphery of the roll 76 and controlled by the weight 79.

The machine may be provided with corrugating rolls 80 and 81, as shown by Figs. 9 and 11, for forming transverse corrugations in the impregnated fabric after it leaves the rolls 42 and 43. Said corrugating rolls 80 and 81 are arranged to act on the strip in close proximity to the rolls 42 and 43. The lower corrugated roll 81 has a gear 82 (Fig. 11) which is connected by an intermediate gear 83 with a gear 42$^b$ on the shaft 42$^a$ of the roll 42, said gear 42$^b$ also meshing with gear 43$^b$ on the shaft 43$^a$ of the upper roll 43.

The upper corrugated roll 80 has a sufficient intermeshing engagement with the lower corrugated roll 81, through the interposed strip to cause its rotation. The strip is in a relatively stiff condition when it encounters the corrugating rolls so that the corrugations imparted to it are adapted to withstand the pressure to which the strip is subjected during the remainder of its course through the machine. Although the corrugations may be somewhat flattened by said pressure, they are sufficiently pronounced when the strip is finally wound on the roll 70, to accomplish the result desired, which is to prepare the fabric for the subsequent operation of pleating it, as shown by Fig. 15, which operation disposes the fabric in short pleats or folds 15ª, the sides of which are pressed together and caused to adhere to each other by the frictioning material.

In Fig. 14 I show corrugating rolls 85, 86, which are arranged to act on the strip as it emerges from the secondary drier, said rolls being journaled in bearings supported by brackets attached to the drier frame. The roll 85 is driven by a sprocket wheel 87 and a sprocket chain 88, engaged with a sprocket wheel on one of the guide rolls 65. The rolls 85, 86 may constitute the sole means for corrugating the strip, or they may supplement the action of the rolls 81, 82, the latter being preferable.

In Figs. 9, 10, 12, and 13, I show oblique rolls 89, arranged in pairs to act on the strip between the impregnating portion of the apparatus and the secondary drier, said rolls being adapted to eradicate wrinkles from the strip by crowding them to the edge of the strip. One pair of rolls is inclined in one direction and the other in a different direction relatively to the path of the strip, as shown by Fig. 10.

The rolls 89 are mounted in yokes 90, each pivoted in a supporting frame 91, so that the inclination or obliquity of the rolls may be varied. The yokes 90 of the lower rolls are connected with the frame 91 by a pivot bolt 92 (Fig. 13). The yokes 90 of the upper rolls are adjustable to vary the pressure of the rolls on the strip, each yoke being mounted on a pivot bolt 93 contained in a sleeve 94 having a screw-thread engagement with a socket 95 on the frame 91. Lock nuts 96 engaged with the sleeve 94 and bearing on the ends of the socket 95 support the sleeve at any desired adjustment.

The rolls 89 are so adjusted that their pressure on the strip will not eradicate corrugations therein. Four pairs of feed rolls 89 are preferably employed, as shown by Figs. 9 and 10, although the number may be greater or less.

97 represents a corrugated washer which is interposed between the sleeve 97 and the upper yoke 90 to aid in locking the yoke at any position to which it may be turned.

I claim—

1. A fabric-impregnating machine comprising a reservoir provided with a fixed bed located below the top of the reservoir and adapted to be covered by a liquid composition contained therein, means for moving the fabric through the tank in contact with the bed, and a pressure member adapted to press the fabric against the bed and movable in opposite directions in a path parallel with the bed, said member bearing on the portion of the fabric which bears on the bed, and acting repeatedly on said portion, the composition being forced into the fabric by the repeated pressure of the said member on the fabric.

2. A fabric-impregnating machine comprising a reservoir provided with a fixed segmental bed, a pressure roll movable in a curved path conforming to the curvature of the bed, means for pressing the roll yieldingly toward the bed, and means for moving the fabric through the tank between the roll and bed.

3. A fabric-impregnating machine comprising a reservoir provided with a fixed bed, means for moving the fabric through the tank in contact with the bed, a pressure member movable in a path conforming to the bed, means for forcing the pressure member yieldingly toward the bed, and means for reciprocating the pressure member, the fabric being passed between the bed and the pressure member.

4. A fabric-impregnating machine comprising a reservoir provided with a fixed segmental bed, means for moving a strip or web of fabric in contact with said bed, a pressure member adapted to coöperate with said bed, a pair of oscillatory levers carrying said pressure member and adapted to move the latter in a curved path conforming to the curvature of the bed, and means for oscillating said levers.

5. A fabric-impregnating machine comprising a reservoir provided with a fixed segmental bed, means for moving a strip or web of fabric in contact with said bed, a pressure member adapted to coöperate with said bed, a pair of oscillatory levers carrying said pressure member and adapted to move the latter in a curved path conforming to the curvature of the bed, and means for oscillating said levers, each lever including a pivoted body portion, and an end portion engaged with the pressure member, and slidingly connected with the body portion, and a spring adapted to yieldingly press the pressure member toward the bed.

6. A fabric-impregnating machine comprising a reservoir provided with a plurality of segmental beds, means for moving a strip or web of fabric in contact with said beds, pressure members coöperating with said beds, carrying means comprising a plurality of pairs of oscillatory levers, each pair carrying one of said pressure members, means for oscillating one pair of levers and the pressure member carried thereby, and connections between the pairs of levers whereby oscillation is imparted from one pair to another.

7. A fabric-impregnating machine comprising a reservoir provided with a fixed segmental bed, means for moving a strip or web of fabric in contact with said bed, a pair of oscillatory levers pivoted adjacent to the bed, a pressure member composed of a pair of rolls and bearings in which said rolls are journaled, and means for oscillating said levers, the said bearings being pivotally connected with the levers to equalize the pressure of the rolls of the pressure member on the fabric interposed between said member and the bed.

8. A fabric-impregnating machine comprising a reservoir provided with a fixed segmental bed, means for moving a strip or web of fabric in contact with said bed, a pressure member adapted to coöperate with said bed, a pair of oscillatory levers carrying said pressure member and adapted to move the latter in a curved path conforming to the curvature of the bed, means for oscillating said levers, and an agitator connected with the levers and movable therewith to stir the composition in the reservoir.

9. A fabric-impregnating machine comprising a reservoir, guide rolls therein arranged to conduct a strip of fabric in substantially horizontal stretches through the reservoir, means for progressively moving the fabric, a bed within the reservoir in contact with one of said stretches, a pressure member adapted to press the fabric against the bed, and means for reciprocating the pressure member.

10. A fabric-impregnating machine comprising a reservoir having means for guiding a strip or web of fabric through a composition contained in the reservoir, and means for forcing the composition into the fabric, a fabric drier composed of two parallel chambers each adapted to be heated, the adjacent sides of said chambers being separated by a narrow passage through which the fabric passes, the delivering end of said passage being above and in close proximity to the reservoir, so that the dried fabric passes in a heated condition into the reservoir, and means for moving the fabric through said drier and reservoir.

11. A fabric-impregnating machine comprising a reservoir, having means for guiding a strip or web of fabric through a composition contained in the reservoir, and means for forcing the composition into the fabric, a fabric drier composed of two parallel chambers each adapted to be heated, the adjacent sides of said chambers being separated by a narrow passage through which the fabric passes, the delivering end of said passage being above and in close proximity to the reservoir, so that the dried fabric passes in a heated condition into the reservoir, means for exhausting air from said passage, and means for moving the fabric through said drier and reservoir.

12. A fabric-impregnating machine comprising a reservoir, having means for guiding a strip or web of fabric through a composition contained in the reservoir, and means for forcing the composition into the fabric, a fabric drier composed of two parallel chambers each adapted to be heated, the adjacent sides of said chambers being separated by a narrow passage through which the fabric passes, the delivering end of said passage being above and in close proximity to the reservoir, so that the dried fabric passes in a heated condition into the reservoir, one of said chambers being subdivided to form a suction box located between the end portions of the chamber and communicating with said passage, and means for drawing air from the suction box and passage.

13. A fabric-impregnating machine comprising an impregnating reservoir having means for guiding a strip or web of fabric through a composition contained in the reservoir, and means for forcing the composition into the fabric, a drier adapted to act on the impregnated fabric leaving the reservoir, means for progressively moving the fabric through the reservoir and drier, and corrugating rolls arranged to transversely corrugate the strip between the reservoir and the drier.

14. A fabric-impregnating machine comprising an impregnating reservoir having means for guiding a strip or web of fabric through a composition contained in the reservoir, and means for forcing the composition into the fabric, a drier adapted to act on the impregnated fabric leaving the reservoir, means for progressively moving the fabric through the reservoir and drier, and corrugating rolls arranged to transversely corrugate the strip after its passage through the drier.

15. A fabric-impregnating machine comprising an impregnating reservoir having means for guiding a strip or web of fabric through a composition contained in the reservoir, and means for forcing the composition into the fabric, a drier adapted to act on the impregnated fabric leaving the reservoir, means for progressively moving the fabric through the reservoir and drier, corrugating rolls arranged to act on the strip between the reservoir and drier, and corrugating rolls arranged to act on the strip after its passage through the drier.

16. A fabric-impregnating machine comprising an impregnating reservoir having means for guiding a strip or web of fabric through a composition contained in the reservoir, and means for forcing the composition into the fabric, a drier adapted to act on the impregnated fabric leaving the reservoir, means for progressively moving the fabric through the reservoir and drier, and obliquely arranged rolls arranged to remove wrinkles from the portion of the strip passing between the reservoir and the drier.

17. A fabric-impregnating machine comprising an impregnating reservoir having means for guiding a strip or web of fabric through a composition contained in the reservoir, and means for forcing the composition into the fabric, a drier adapted to act on the impregnated fabric leaving the reservoir, means for progressively moving the fabric through the reservoir and drier, obliquely arranged rolls arranged to remove wrinkles from the portion of the strip passing between the reservoir and the drier, and means for varying the obliquity of said rolls.

In testimony whereof I have affixed my signature, in presence of two witnesses.

PHILIP W. PRATT.

Witnesses:
C. F. BROWN,
P. W. PEZZETTI.